UNITED STATES PATENT OFFICE.

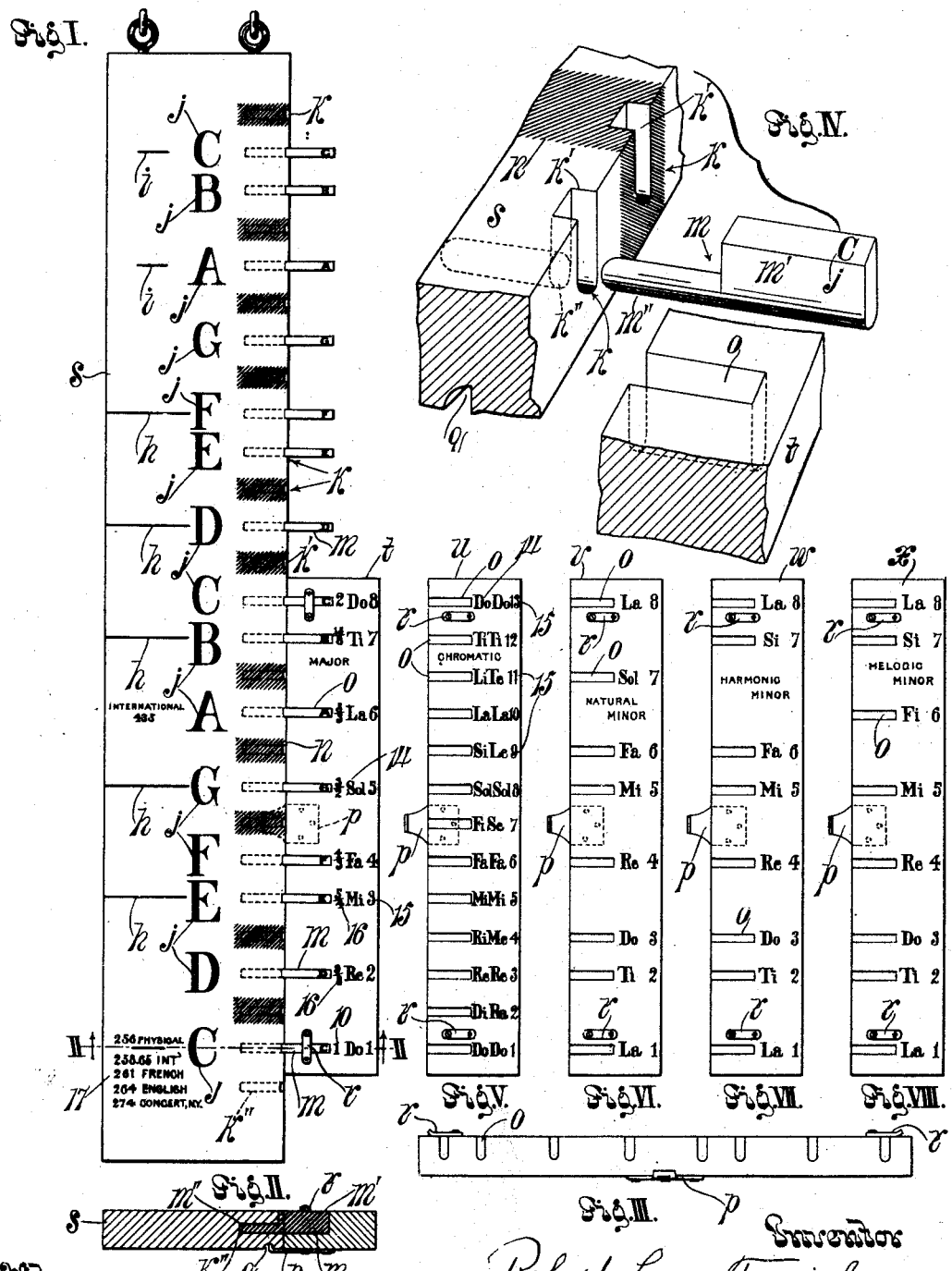

ROBERT LOVE FRAISHER, OF GLENDORA, CALIFORNIA.

MUSIC-SCALE EDUCATIONAL APPARATUS.

SPECIFICATION forming part of Letters Patent No. 666,247, dated January 15, 1901.

Application filed March 30, 1900. Serial No. 10,832. (No model.)

*To all whom it may concern:*

Be it known that I, ROBERT LOVE FRAISHER, a citizen of the United States, residing at Glendora, in the county of Los Angeles and State of California, have invented a new and useful Music-Scale Educational Apparatus, of which the following is a specification.

My invention relates to devices for teaching the theory and notation of music.

My invention comprises the combination of a staff member marked to indicate the lines and spaces of a music-staff, a scale member marked to indicate the lines and spaces which represent a given music-scale, and movable position-determining members for adjustment relative to the lines and spaces of the staff member and scale member to allow the scale member to fit alongside the staff member at that position only where the key-note of the scale represented by the scale member will register with the line or space of the staff member which is devoted to such note.

The invention is capable of being carried out in various ways, and I will not attempt in this specification to show the various modifications in which it may be carried out.

I will now describe the mode of embodying my invention which I at present deem preferable. In this form a staff member is provided marked with lines and pitch-names of the degrees of the music-staff in a given key and provided, respectively, with seats having a cylindrical portion and a rectilinear or flat-faced portion, pegs, respectively, having a cylindrical portion and a rectilinear or flat-faced portion to fit the seats, respectively, and to project therefrom, and a scale member provided with seats to fit a portion of the rectilinear or flat-faced part of the pegs.

My invention includes a music-scale educational apparatus comprising a staff board or member marked on one face with the lines and pitch-names of the degrees of the music-staff and provided with seats at uniform distances apart corresponding to the same degrees, movable pegs or members for said seats, and a scale piece or member provided with seats for the pegs arranged relative to the seats of the staff-board at distances apart corresponding to the degrees of a music-scale. In practical application the apparatus is provided with five scale pieces or members representing the major scale, the chromatic scale, and the natural, harmonic, and melodic minor scales. The arrangement of the seats in the several scale-pieces corresponds to the arrangement of the tones of their respective scales.

The purposes of my invention are, first, to provide an object by which the teacher can illustrate and easily and clearly explain the rudimentary principles of music; second, to provide an instrument by means of which a child can positively determine the number and names of the sharps or flats of any key and the signature of that key; third, to furnish the pupil something tangible and concrete in his study of the scales and keys, thereby giving him a more vivid and comprehensive idea of the subject with less effort than is usually required, and, fourth, to graphically show the relation between the music-staff and the keyboard of the pianoforte and similar instruments. I attain these objects by the mechanism illustrated in the accompanying drawings, in which—

Figure I is a view of my invention in use for illustrating the major scale in the key of C. Fig. II is a plan section on line II II, Fig. I. Fig. III is an edge elevation of one of the scale-pieces to show the peg-seats therein. The major scale-piece is shown in this view. Fig. IV is a fragmental detail to illustrate the movable pegs and the seats therefor in the staff-board and scale-piece. Fig. V shows the face of the chromatic scale-piece. Figs. VI, VII, and VIII show the faces of the natural, the harmonic, and the melodic minor scale-pieces, respectively.

Similar characters refer to similar parts throughout the several views.

$s$ indicates the staff-board; $t$, the major scale-piece; $u$, the chromatic scale-piece; $v$, the natural minor scale-piece; $w$, the harmonic minor scale-piece, and $x$ the melodic minor scale-piece.

The staff-board $s$ is provided with five lines $h$ to represent the five lines of the treble-staff and with short lines $i$ to represent the ledger-lines above and below the staff. The letters $j$, corresponding to the pitch-names of the several tones represented on the treble-staff, are placed along the mid-line of the staff-board opposite their respective lines and spaces, beginning with middle C on the first ledger-line below the staff and ending with high C on the second ledger-line above the staff, thus making two octaves in the natural key, or key of C. The staff-lines $h$, the ledger-lines $i$, and the pitch-name letters $j$ are so placed—i. e., by properly spacing them—as to show the relative positions of whole tones and half-tones in the natural key—that is to say, the half-tones are indicated between E and F and between B and C. The staff-board is provided in its edge with twenty-seven seats $k$, at equal intervals, to represent the chromatic tones of the two octaves, the half-tone below middle C, and the half-tone above high C. The movable scale-member-supporting members or pegs $m$ are placed normally—i. e., in the key of C—in the holes $k$ opposite the pitch-name letters $j$ or their lines and spaces on the staff-board $s$. Hence fifteen pegs $m$ are used. The staff-board is preferably blackened or otherwise colored, as at $n$, at the seats representing semitones of the key of C, as between C and D, D and E, F and G, &c. The blackened portions $n$ preferably extend across the edge of the staff-board and across the portion of the face, say, one and one-half inches from the edge of the staff-board, thus showing the resemblance between the staff-board and the key-board of the piano and of similar instruments. (See Figs. I and IV.) The holes or seats $k$ are each provided with a flat-faced recess, as at $k'$, and the pegs are formed with like flat faces $m'$ to prevent the pegs from turning when fully placed in position. Preferably an inner portion $k''$ of each hole and a corresponding portion $m''$ of each peg are made cylindrical to fit each other, and the outer portion or head of each peg corresponds to a lateral extension of such cylinder in a rectangular figure the front face of which will be flush with the front face of the staff-board when the pin is fully seated in its seat and is marked with an appropriate pitch-name letter $j$. The recess $k'$ in the staff-board extends to the face of the board for this purpose and is of less length than and seats only a portion of the head $m'$ of the peg, so that a considerable portion of said head $m'$ extends from the edge of the staff-board.

Each of the scale-pieces is provided with seats $o$ to fit and seat the projecting portion of the pegs $m$ when they are seated in the staff-board. The seats in the several scale-pieces are arranged at appropriate intervals, corresponding to the intervals of the tones represented by such scale-piece. The seats or notches $o$ extend to one face of their respective scale-pieces after the manner of the recesses $k'$ of the staff-board. On the reverse face of each of the scale-pieces a hook $p$ is attached and projects beyond the edge of the scale-piece to hook into a groove $q$ in the rear face of the staff-board whenever the two are brought into operative position, as indicated in Fig. I. The staff-board is preferably provided with a groove $q$, extending from end to end of the staff-board, so that the hooks $p$ will catch into the groove at any position in which the scale-piece can be set.

$r$ indicates buttons or clasps on the front faces of the several scale-pieces to be turned to extend over the pegs $m$ when seated in the seats $o$. By means of the clasps upon the pins and the hook hooked into the groove $q$ the scale-piece will be held firmly in position.

There are eight notches or seats $o$ in the major scale-piece $t$, representing the eight tones of the major scale. The syllables 14 and numbers 15 of these tones are marked on the right side of said scale-piece opposite their respective notches. The location of the half-steps of the scale between 3 and 4 (Mi and Fa) and 7 and 8 (Ti and Do) is shown by making the distance between their corresponding notches half as great as that between those representing whole steps. Thus when the scale-piece is placed with 1 or Do on C of the staff-board, its several notches exactly fit the pegs of the staff-board if such pegs are in their normal position. If any other key than the key of C in the major scale is desired, the pegs of the staff-board are first-placed in their normal position—i. e., key of C. Then the notch at 1 or Do of the major scale-piece $t$ is placed on the peg—e. g., the peg at G—corresponding to the desired key—e. g., key of G. Then it is found that the rest of the notches will not match the pegs until some of the pegs are raised (sharped) or lowered, (flatted.) Thus in the key of G the F-peg has to be raised (sharped)—i. e., placed in the hole blackened between F and G. Then the scale-piece will fit on all the pegs. Hence it will be found that in the key of G major there is one sharp, (♯F.) It will also be shown that F is on the top line of the staff and that the signature of the key of G major is one ♯ placed on the fifth or top line of the staff. The ratios of the number of vibrations of the several tones of the major scale are preferably marked as at 16 on the major scale-piece opposite their respective notches—i. e., "1" at the end of the first notch, Do, "9/8" at the end of the second notch, Re, &c. The numbers of vibrations regarded as "middle C" are also preferably marked, as at 17, on the staff-board opposite that letter. By multiplying the number of vibrations of middle C by the appropriate ratio the number of vibrations of any tone of the mathematical scale can be determined. The other scale-pieces $u$, $v$, $w$, and $x$ are made the same as the major scale-piece $t$, except that the position of the notches is such as to show the relation of the tones in each scale, and the syllables and numbers are placed correspondingly.

What I claim, and desire to secure by Letters Patent of the United States, is—

1. In a music-scale apparatus, the combination of a staff member marked to indicate the lines and spaces of a music-staff; a scale member marked to indicate the lines and spaces which represent a given music-scale; and movable scale-member-supporting members for adjustment relative to the lines and spaces of the staff member and scale member to connect the scale member with the staff member and to allow the scale member to fit alongside the staff member at that position only where the key-note of the scale represented by the scale member will register with the line or space of the staff member which is devoted to such note.

2. A music-scale apparatus comprising a staff member marked with lines and pitch-names of the degrees of the music-staff in a given key and provided with seats at uniform distances apart corresponding to the degrees of the music-staff; movable pegs for such seats; and a scale member provided with seats for the pegs arranged relative to the seats of the staff member at distances apart corresponding to the degrees of a music-scale.

3. The combination of a staff member marked with lines and pitch-names of the degrees of the music-staff in a given key, and provided with seats at uniform distances apart corresponding to the degrees of the music-staff; movable pegs for such seats; the face of the staff member being colored to indicate the location of the seats corresponding to the half-tones of the scale in said key; movable pegs for the seats; and a scale member provided with seats for the pegs arranged relative to the seats of the staff member at distances apart corresponding to the degrees of a music-scale.

4. A music-scale apparatus comprising a staff member marked with lines and pitch-names of the degrees of the music-staff in a given key and provided with seats at uniform distances apart corresponding to the degrees of the music-staff; movable pegs for such seats; a scale-piece provided with seats for the pegs arranged relative to the seats of the staff member at distances apart corresponding to the degrees of a music-scale; and means for fastening the staff member and scale member together.

5. The combination of a staff member marked with lines and pitch-names of the degrees of the music-staff in a given key and provided with seats having a cylindrical portion and a rectilinear portion; pegs, respectively having a cylindrical portion and a rectilinear portion to fit the seats, respectively; and a scale member provided with seats to fit a portion of the rectilinear parts of the pegs.

6. The combination of a staff member marked with lines and pitch-names of the degrees of the music-staff in a given key and provided with seats having a cylindrical portion and a rectilinear portion; pegs, respectively having a cylindrical portion and a rectilinear portion to fit the seats respectively; a scale member provided with seats to fit a portion of the rectilinear part of the peg; and means for fastening the scale member in position relative to the staff member.

7. The combination of a staff member provided with a longitudinal groove and marked with lines and pitch-names of the degrees of the music-staff in a given key and provided with seats having a cylindrical portion and a rectilinear portion; pegs, respectively having a cylindrical portion and a rectilinear portion to fit the seats respectively; a scale member provided with seats to fit a portion of the rectilinear parts of the pegs; a hook fastened to the scale member and extending to fit in the groove of the staff member; and means for retaining the pegs in their seats in the scale member.

In testimony whereof I have signed my name to this specification, in the presence of two subscribing witnesses, at Los Angeles, California, this 17th day of March, 1900.

ROBERT LOVE FRAISHER.

Witnesses:
JAMES R. TOWNSEND,
JOHN A. MORRIS.